United States Patent
Amerga

(10) Patent No.: US 7,917,163 B2
(45) Date of Patent: Mar. 29, 2011

(54) INTRA-FREQUENCY SEARCHING IN THE PRESENCE OF FREQUENCY GAPS

(75) Inventor: Messay Amerga, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 856 days.

(21) Appl. No.: 10/650,564

(22) Filed: Aug. 27, 2003

(65) Prior Publication Data

US 2005/0054368 A1    Mar. 10, 2005
US 2010/0216505 A1    Aug. 26, 2010

(51) Int. Cl.
  H04B 1/00    (2006.01)
  H04B 7/00    (2006.01)
  H04B 1/38    (2006.01)
  H04B 7/216   (2006.01)
  H04B 15/00   (2006.01)
  H04W 36/00   (2009.01)
  H04J 3/06    (2006.01)

(52) U.S. Cl. ........ 455/516; 455/525; 455/574; 455/436; 455/437; 455/442; 455/502; 370/350; 370/342; 375/130; 375/140; 375/142; 375/150

(58) Field of Classification Search .................. 455/516, 455/434, 525, 574, 436, 437, 502, 442; 370/350, 370/342; 375/130, 140, 142–150
See application file for complete search history.

(56) References Cited

U.S. PATENT DOCUMENTS

| | | | |
|---|---|---|---|
| 6,208,631 B1* | 3/2001 | Kim | 370/332 |
| 6,714,789 B1* | 3/2004 | Oh et al. | 455/456.1 |
| 6,810,019 B2* | 10/2004 | Steudle | 370/252 |
| 6,983,149 B2* | 1/2006 | Lindquist et al. | 455/436 |
| 7,110,765 B2* | 9/2006 | Amerga et al. | 455/436 |
| 7,133,702 B2* | 11/2006 | Amerga et al. | 455/574 |
| 7,155,183 B2* | 12/2006 | Abraham | 455/192.1 |
| 7,155,229 B2* | 12/2006 | Dent | 455/450 |
| 7,162,265 B2* | 1/2007 | Ormson et al. | 455/552.1 |
| 7,197,341 B2* | 3/2007 | Bultan et al. | 455/574 |
| 2003/0078043 A1* | 4/2003 | Horwath et al. | 455/436 |
| 2003/0153370 A1* | 8/2003 | Sako | 455/574 |
| 2004/0043798 A1* | 3/2004 | Amerga et al. | 455/574 |
| 2004/0219915 A1* | 11/2004 | Bamburak et al. | 455/435.2 |

* cited by examiner

*Primary Examiner* — Matthew D Anderson
*Assistant Examiner* — Bobbak Safaipour
(74) *Attorney, Agent, or Firm* — Ramin Mobarhan

(57) ABSTRACT

Techniques for intra-frequency searching in the presence of frequency gaps are disclosed. In one embodiment, a search is scheduled and frequency switches are suppressed during the scheduled search. In another embodiment, a search is scheduled in between anticipated frequency gaps. In yet another embodiment, a timer is deployed, the expiration of which indicates a search is to be scheduled. In yet another embodiment, a timer is deployed, the expiration of which indicates a search is to be scheduled and frequency switches are suppressed during the scheduled search. Various other embodiments are also presented. Benefits include allowing prescribed levels of intra-frequency and inter-frequency search to be performed which allows for improved base station selection and therefore improved performance and system capacity.

20 Claims, 6 Drawing Sheets

INTRA-FREQUENCY SEARCHING IN THE PRESENCE OF FREQUENCY GAPS

FIELD

The present invention relates generally to wireless communications, and more specifically to intra-frequency searching in the presence of frequency gaps.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards. An example non-CDMA system is the GSM system.

Neighboring systems may employ one or more radio access technologies on one or more frequencies. Furthermore, a system may have one radio access technology overlaying another. For example, portions of a GSM system may be overlapped with W-CDMA base stations. It may be desirable for a mobile station communicating on the W-CDMA system to handoff to the GSM system without dropping an active call.

To facilitate such handoff, and to maintain a call on a serving system, a mobile station may be required to periodically search for base stations on alternate frequencies and/or alternate radio access technologies while searching on the serving frequency as well. The W-CDMA specification, for example, provides for a compressed mode, in which gaps in transmission and reception on a serving frequency are introduced, allowing the mobile station to switch frequencies and perform measurements or searching on an alternate frequency while maintaining an active call. However, frequency discontinuity may interfere with a search that is being performed on the serving frequency.

To maintain communication performance on the serving frequency, intra-frequency searching of a minimum level should be maintained. At the same time, overall communication performance requires inter-frequency measurements to allow for handoff, when necessary. Minimum periods between intra-frequency searches may be prescribed for a system. The performance of a system, including throughput as well as system capacity, relies in part on efficient use of available base stations, both inter-frequency and intra-frequency, including inter-Radio Access Technology (inter-RAT) base stations. Thus, intra-frequency search requirements should be performed at prescribed levels, while allowing for frequency discontinuities (Such as defined for compressed mode). There is therefore a need in the art for intra-frequency searching in the presence of frequency gaps.

SUMMARY

Embodiments disclosed herein address the need for intra-frequency searching in the presence of frequency gaps. In one embodiment, a search is scheduled and frequency switches are suppressed during the scheduled search. In another embodiment, a search is scheduled in between anticipated frequency gaps. In yet another embodiment, a timer is deployed, the expiration of which indicates a search is to be scheduled. In yet another embodiment, a timer is deployed, the expiration of which indicates a search is to be scheduled and frequency switches are to be suppressed during the scheduled search. Various other embodiments are also presented. Benefits include allowing prescribed levels of intra-frequency and inter-frequency search to be performed which allows for improved base station selection and therefore improved performance and system capacity.

DETAILED DESCRIPTION

Figure 1:
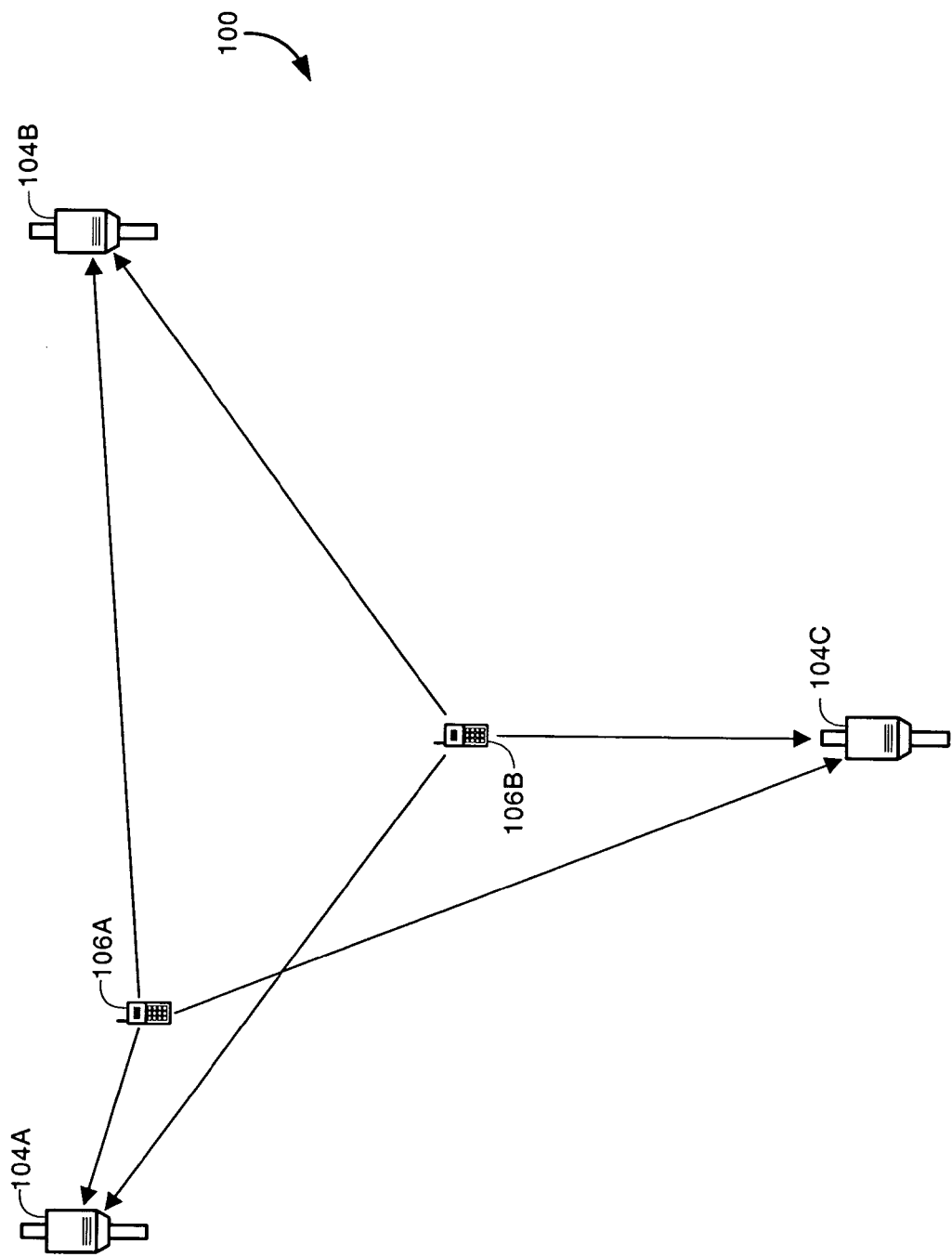
FIG. 1 is a general block diagram of a wireless communication system shown to support a number of users.

FIG. 1 is a diagram of a wireless communication system 100 that may be designed to support one or more wireless standards and/or designs (e.g., the W-CDMA standard, the IS-95 standard, the cdma2000 standard, the HDR specification, the 1xEV-DV proposal, the GSM standard). In the exemplary embodiment, system 100 supports W-CDMA communications as well as GSM communications.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications. A mobile station is an example of a wireless communication device.

Depending on the system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A mobile station 106, such as 106A, during an active call, communicates with a serving base station, 104A, for example. The serving base station periodically updates a list of potentially available neighboring base stations to the mobile stations with which it is communicating. Each mobile station periodically measures the received signal strength of base stations on the neighbor list, and reports the results of those measurements to the serving base station. Differing wireless communication standards may provide different requirements for reporting.

A mobile station 106 may be required to monitor a serving frequency, as well as other frequencies or other Radio Access Technologies (RATs), while simultaneously maintaining a voice or data call with the serving base station. In an example embodiment, system 100 comprises W-CDMA base stations as well as GSM base stations. The W-CDMA and/or GSM base stations may be transmitting on different frequencies. The mobile station 106 may be required to periodically search the Active Set, a synchronous monitored set of neighbors, asynchronous W-CDMA cells on the serving frequency, inter-frequency W-CDMA cells, inter-RAT cells, or any combination of the above, to maintain timing and received signal strength of the various base stations.

Separate receive chains may be deployed to allow for simultaneous monitoring of the serving cell and for searching the inter-frequency cells, although this may not be efficient in terms of hardware costs and power consumption. Instead, the W-CDMA specification provides a compressed mode. In compressed mode, gaps are introduced during which reception and transmission are stopped so that the mobile station may switch frequencies or radio access technologies to make measurements, without losing data transmission from or to the serving cell. Example measurements performed during a gap include GSM RSSI measurements and inter-frequency W-CDMA cell location, i.e. Base Station Identification Code (BSIC) demodulation to identify a cell. Different sizes of gaps may be introduced to perform differing types of measurements. Both the base station 104 and the mobile station 106 are aware of the timing location and the duration of the gaps. In example embodiments, detailed below, a Compressed Mode (CM) manager knows the location of future gaps for a limited time in the future.

In addition to performing inter-frequency or inter-RAT searches, the mobile station maintains the timing of the serving base station or stations (i.e. the Active Set), as well as the timing of a selected set of monitored neighbor base stations (the monitored set), and determines the presence of previously undetected base stations.

In the example W-CDMA embodiment, a mobile station may maintain the timing of base stations with known scrambling codes and timing offsets by performing relatively quick searches, known as list searches. A list search may be carried out by performing a windowed search of a known scrambling code around its last known location. This is useful to maintain timing of currently monitored cells, or reacquisition of previously identified cells. A minimum search frequency may be prescribed to ensure that the timing of these known cells, and their energy levels, are maintained.

To locate a previously undetected base station, a full search may be performed. A three-step process, known as a step 1/2/3 search, comprising a step 1 search, a step 2 search, and a step 3 search, can be used to determine the scrambling code and the frame timing of the base station. Step 1 and Step 2 searches are relatively longer search processes, and may be difficult to complete if interrupted by a frequency switch introduced by a compressed mode gap. Step 3 searching is comparable in search processing to a list search. List searches and step 3 searches are relatively shorter, and thus are more likely to be completed in between gaps. They can be reattempted if interrupted, and an interrupted search may be more readily resumed following a frequency gap. These search classes are provided for illustration only, as the principles disclosed herein apply to any type of searching in the presence of frequency discontinuity.

A description of the W-CDMA full search, or step 1/2/3 search, is as follows. In step one, the mobile station searches for the primary synchronization code (PSC), a component of the primary synchronization channel. The PSC is a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

In step two, the mobile station searches for the secondary synchronization codes (SSCs), which make up the secondary synchronization channel. There are 16 256-chip SSCs. Each base station transmits one SSC, along with the PSC, in the first 256 chips of every slot (each of the 16 SSCs and the PSC are orthogonal). There are 64 unique sequences of 15 SSCs, each sequence being associated with one of 64 scrambling code groups. Each base station transmits one SSC sequence (15 SSCs per frame) corresponding to the code group containing that base station's scrambling code. The set of 64 SSC sequences are selected to be comma free; that is, no sequence is equal to a cyclic shift of any of the other sequences or any non-trivial cyclic shift of itself. Because of this property, once a mobile station determines the sequence of SSCs transmitted in any 15 consecutive slots, it can determine both the frame timing and which of the 64 SSC sequences was transmitted, thus identifying the scrambling code group in which the base station belongs. Since there are eight primary scrambling codes in each code group, the number of candidates has been reduced to eight.

In step three, the eight scrambling code candidates identified in step two must be searched to determine which one is the correct code. This can be carried out by performing a chip-by-chip correlation, accumulating energies over some number of chips until a decision can be made. Step three is comparable to a list search.

Various systems may place requirements for maximum delay between searches of any type, minimum frequency of a search, or maximum delay between searches of various types (for example, between steps 1 and 2, or 2 and 3).

If gaps occur too frequently, it may be difficult to perform the intra-frequency searching required. Some gaps may be suppressed to meet the intra-frequency requirement. This can be performed so as to leave ample gaps to perform required inter-frequency or inter-RAT searching as well. For example, GSM RSSI measurements can be made or W-CDMA neighbors on alternate frequencies can be searched. Any other inter-RAT search may be performed as well. System performance is enhanced when a mobile station maintains accurate timing with regards to serving frequency cells, and may thus identify new cells and the optimal Active Set may be selected. In addition, accurate inter-frequency measurements of alternate frequencies and/or RATs allows for proper handoff to an alternate frequency and/or RAT, when such handoff is in order. Techniques described herein may be deployed to use a single receive resource to achieve the desired balance between inter-frequency/inter-RAT and intra-frequency search and measurement requirements.

Figure 2:
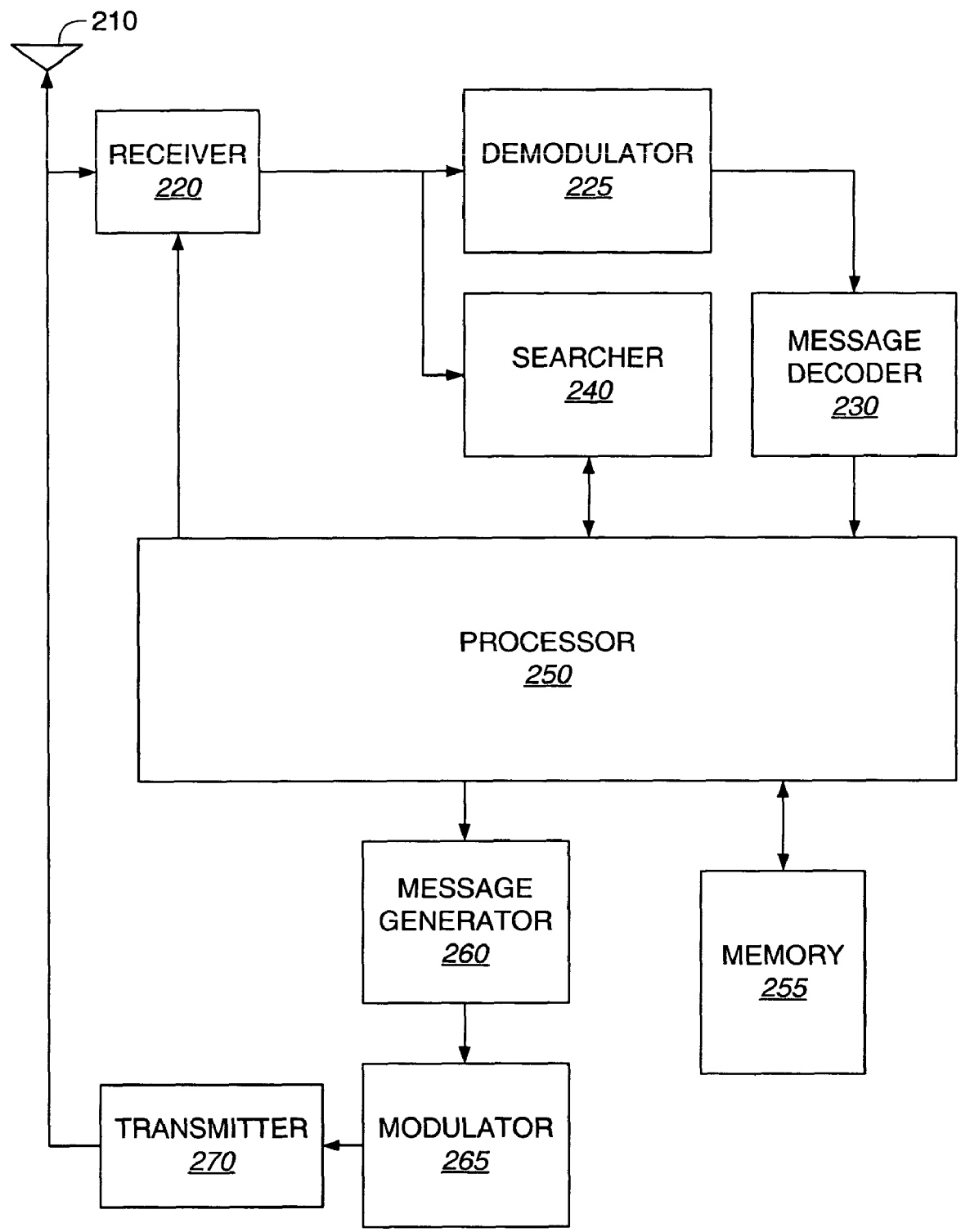
FIG. 2 is a block diagram of a wireless communication device, such as a mobile station.

FIG. 2 is a block diagram of a wireless communication device, such as mobile station 106. The blocks depicted in this example embodiment will generally be a subset of the components included in a mobile station 106. Those of skill in the art will readily adapt the embodiment shown in FIG. 2 for use in any number of mobile station configurations. A wireless communication device may comprise one or more Integrated Circuits (ICs). For example, a receiver may comprise one or more special purpose ICs along with a baseband processing IC. Those of skill in the art will recognize that the various blocks illustrated below may be configured in any combination of hardware (including special purpose ICs and/or general purpose processors) and/or software.

Signals are received at antenna 210 and delivered to receiver 220. Receiver 220 performs processing according to one or more wireless system standards, such as the standards listed above. Receiver 220 performs various processing such as Radio Frequency (RF) to baseband conversion, amplification, analog to digital conversion, filtering, and the like. Various techniques for receiving are known in the art. Receiver 220 may receive at various frequencies, as programmed by processor 250. Receiver 220 may include a frequency generator for generating these various frequencies, which may be incorporated with one or more components of the wireless communication device in a Radio Frequency IC (RFIC) (details not shown).

Signals from receiver 220 are demodulated in demodulator 225 according to one or more communication standards. In an example embodiment, a demodulator capable of demodulating GSM and W-CDMA signals is deployed. In alternate embodiments, alternate standards may be supported, and embodiments may or may not support multiple communication formats. Demodulator 230 may perform RAKE receiving, equalization, combining, deinterleaving, decoding, and various other functions as required by the format of the received signals. Various demodulation techniques are known in the art. Data and control channels are examples of channels that can be received and demodulated in receiver 220 and demodulator 225.

Message decoder 230 receives demodulated data and extracts signals or messages directed to the mobile station 106 on the forward or link. Message decoder 230 decodes various messages used in setting up, maintaining and tearing down a call (including voice or data sessions) on a system. Messages may include neighbor list messages, or control channel messages used for demodulating the forward link. Various other message types are known in the art and may be specified in the various communication standards being supported. The messages are delivered to processor 250 for use in subsequent processing. Some or all of the functions of message decoder 230 may be carried out in processor 250, although a discrete block is shown for clarity of discussion. Alternatively, demodulator 225 may decode certain information and send it directly to processor 250 (a single bit message such as an ACK/NAK or a power control up/down command are examples).

Searcher 240 is also deployed to receive signals from receiver 220. Searcher 240 may perform searching on incoming received samples as well as off-line searching on data from a sample RAM (details not shown). Searcher 240 performs searching in accordance with search parameters provided by processor 250. Various techniques for initiating searches of various types with searcher 240 are detailed below.

Signals are transmitted via antenna 210. Transmitted signals are formatted in transmitter 270 according to one or more wireless system standards, examples of which are listed above. Examples of components that may be included in transmitter 270 are amplifiers, filters, digital-to-analog (D/A) converters, radio frequency (RF) converters, and the like. Data for transmission is provided to transmitter 270 by modulator 265. Data and control channels can be formatted for transmission in accordance with a variety of formats. Examples of components that may be incorporated in modulator 265 include encoders, interleavers, spreaders, and modulators of various types.

Message generator 260 may be used to prepare messages of various types, as described herein. For example, a message indicating a located neighbor base station may be generated. Various types of control messages may be generated in a mobile station 106 for transmission on the reverse link.

Data received and demodulated in demodulator 225 may be delivered to processor 250 for use in voice or data communications, as well as to various other components. Similarly, data for transmission may be directed to modulator 265 and transmitter 270 from processor 250. For example, various data applications may be present on processor 250, or on another processor included in the wireless communication device 106 (not shown). Wireless communication device 106 may include a link to or be incorporated with an external device, such as a laptop computer (not shown).

Processor 250 may be a general-purpose microprocessor, a digital signal processor (DSP), or a special-purpose processor. Processor 250 may perform some or all of the functions of receiver 220, demodulator 225, message decoder 230, searcher 240, message generator 260, modulator 265, or transmitter 270, as well as any other processing required by the wireless communication device. Processor 250 may be connected with special-purpose hardware to assist in these tasks (details not shown). Data or voice applications may be external, such as an externally connected laptop computer or connection to a network, may run on an additional processor within wireless communication device 106 (not shown), or may run on processor 250 itself. Processor 250 is connected with memory 255, which may be used for storing data as well as instructions for performing the various procedures and methods described herein. Those of skill in the art will recognize that memory 255 may be comprised of one or more memory components, of various types, that may be embedded in whole or in part within processor 250.

Figure 3:
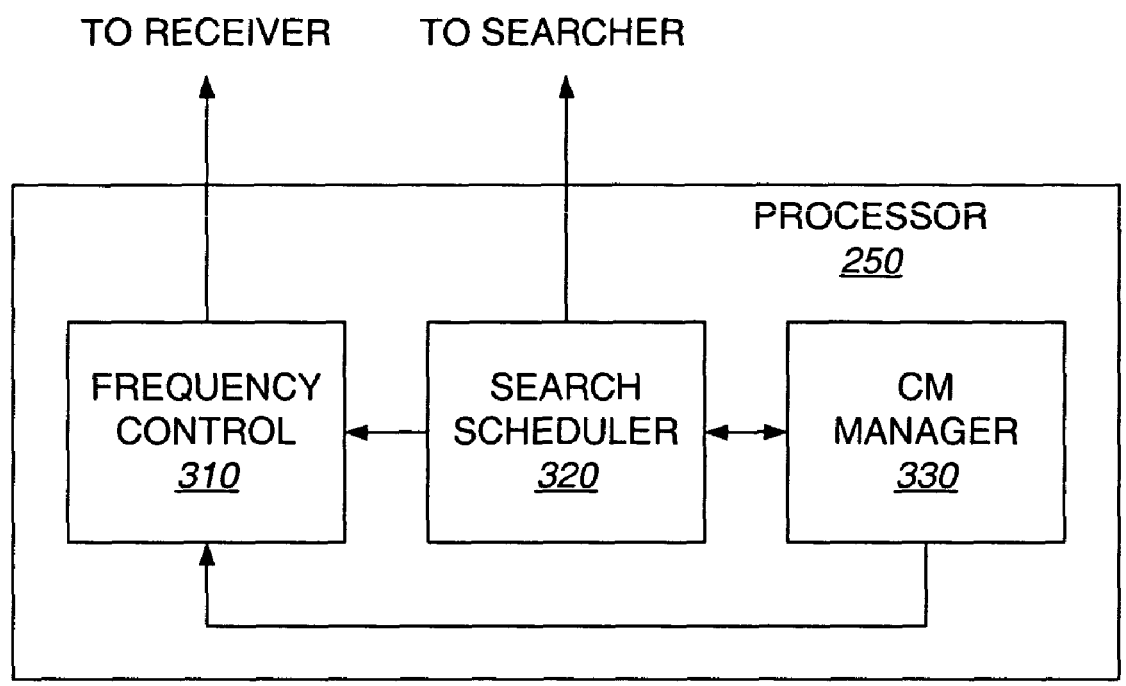
FIG. 3 depicts an embodiment of a processor configured for compressed mode management, search scheduling, and frequency control.

FIG. 3 depicts an embodiment of a processor 250 configured for compressed mode management, search scheduling, and frequency control. Three processes are depicted in FIG. 3, for clarity of discussion. Only a subset of the processes that may be incorporated in processor 250 are shown. Alternate embodiments may partition the various functions in alternate ways, as will be readily apparent to those of skill in the art. In yet another alternative, the various functions shown deployed in processor 250 may be instead deployed in discrete hardware.

Compressed Mode (CM) manager 330 communicates with search scheduler 320 and frequency control 310. CM manager 330 is used to manage compressed mode gaps. As described above, compressed mode is used to introduce a frequency gap, a brief time during which the mobile station will not need to monitor the serving frequency and the base station will not receive signals on the reverse link from the mobile station on the serving frequency. The mobile station may retune from the serving frequency to an alternate frequency, perform whatever measurements are desired on the alternate frequency, typically searching, and then retune to the serving frequency in time to resume communication on the serving frequency.

The CM manager 330 may determine upcoming gaps via base station signaling, or other methods known in the art. The purpose of the gap (i.e. GSM RSSI measurement or identification of alternate frequency W-CDMA cells) may also be known.

In the illustration of FIG. 3, the CM manager is used to open up a gap by directing frequency control 310 to change to an alternate frequency. Frequency control 310 connects with a receiver, equipped to receive at a frequency designated by frequency control 310. When the gap is closed, frequency control 310 directs the receiver to return to the original communication frequency.

CM manager 330 is shown connected to search scheduler 320. In this embodiment, search scheduler 320 may poll CM manager 330 for information about compressed mode gaps. CM manager 330 knows the near future in terms of when a gap is scheduled, how long the gap will be, when the next gap-free period of a certain length may occur, etc. CM manager 330 returns this information to search scheduler, for use in maintaining the prescribed search regimen, described above. Such use is detailed further below with respect to FIGS. 4-5.

Search scheduler 320 is also shown connected to frequency control 310. As will be detailed further below, search scheduler may periodically need to prevent a gap from opening in order to carry out a required inter-frequency search. The search scheduler may override any commands from CM manager 330 to perform a frequency switch or open a gap. The gaps may be blocked for a programmed period of time. Alternatively, the search scheduler may issue a block gap command to frequency control 310 that remains active until it is rescinded. Frequency control 310 may be connected with a frequency generator, which may be collocated on one IC or on another connected IC, such as a Radio Frequency IC (RFIC) (details not shown).

Those of skill in the art will recognize various means for CM manager 330 to convey gap information to search scheduler 320. In this embodiment, the two blocks are processes running on the processor 250. There may be a query-response interface defined using function calls or the equivalent. Alternatively, CM manager 330 may store information about upcoming gaps in a shared memory, such as memory 255. Then search scheduler 320 may simply access the shared memory at a predefined memory location, such as a stored table, to determine the information needed to perform search scheduling. As such, it is possible to deploy a search scheduler alongside a CM manager such that the CM manager performs its tasks without interrelating with the search scheduler. The search scheduler merely looks at the table of gap information to make its scheduling determinations, and prevents any compressed mode gaps from opening when it is necessary to do so.

Figure 4:
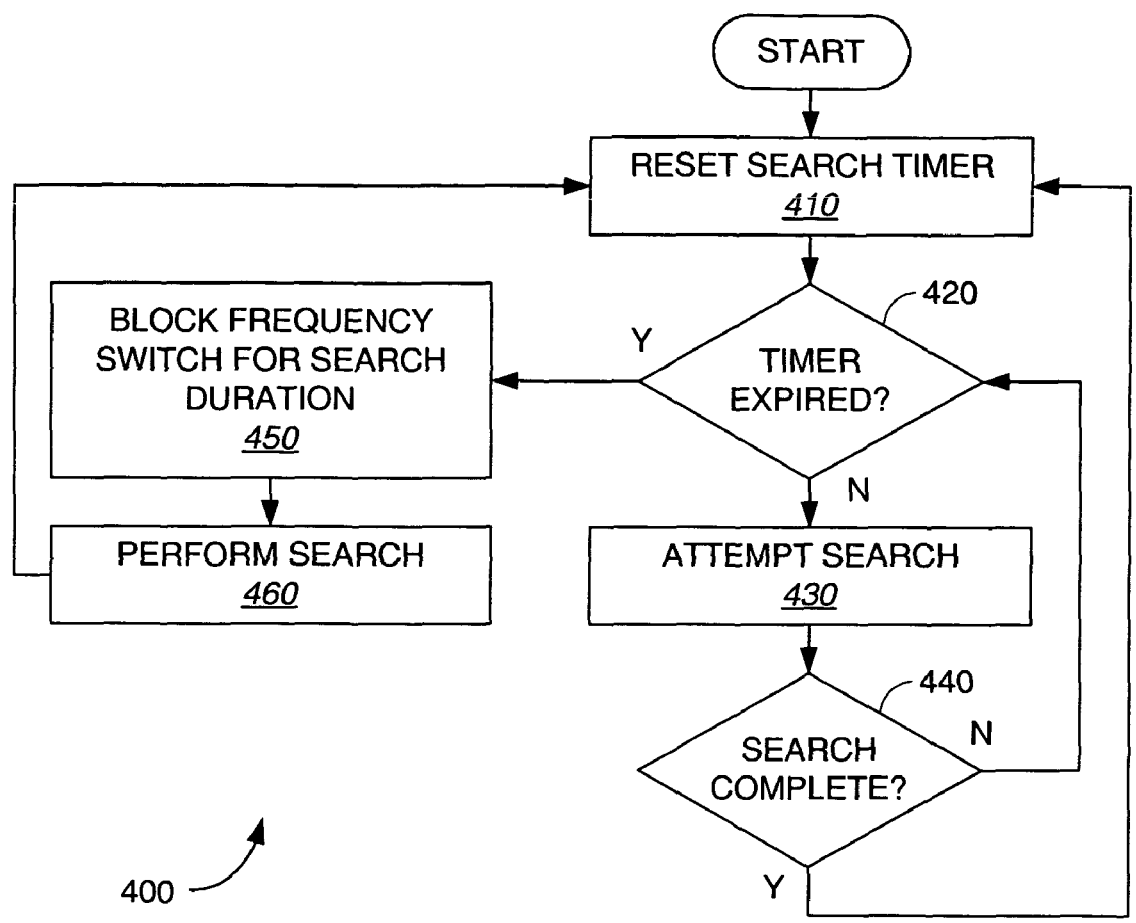
FIG. 4 is a flowchart of a method of performing intra-frequency search in the presence of frequency gaps.

FIG. 4 is a flowchart of a method 400 of performing intra-frequency search in the presence of frequency gaps. Method 400 is one such method that may be deployed in a search scheduler 320, described above. The embodiment shown in FIG. 4 does not require an interface with a frequency gap control block, such as CM manager 330. It can be used in a search scheduler 320 with an ability to block a frequency switch, or gap, such as shown in FIG. 3. This method provides a minimum search frequency, while generally allowing frequency gaps to be unimpeded to perform the tasks for which they were designed. Gaps will be prevented only to guarantee the minimum required intra-frequency search requirements. Method 400 is a generalized embodiment described with respect to a single search type. Those of skill in the art will readily expand the principles illustrated herein to one or more search types of various kinds. One such example is detailed below with respect to FIG. 5.

Process 400 starts in step 410, where a search timer is reset. The search timer is programmed to expire once the maximum time between successful searches has been reached, thus providing a guaranteed minimum search frequency. Various timer mechanisms are well known in the art.

In decision block 420, if the search timer has not expired, proceed to step 430. In step 430, the search process is begun. This may be implemented by sending desired search parameters to a searcher, such as searcher 240. Proceed to decision block 440 to test if the search reaches completion before a frequency gap interferes. This method is applicable to searches that may be segmented, so that the search may continue after being interrupted. The details of this option are not shown in FIG. 4. For illustration purposes, the embodiment of method 400 uses a search process that is simply aborted if a frequency gap interrupts the search before it is completed. If the search completes, return to step 410 to reset the search timer. A successful search allows the timer to be reset to establish a new maximum time allowed before a gap may need to be prevented. In so doing, interference with frequency gaps, and the measurements or searches performed within them, may be minimized.

In decision block 440, if the search is interrupted with a gap, and thus aborted, return to decision block 420 to determine if the search timer has expired. If the search timer expires, proceed to step 450.

In step 450, frequency switching is disabled for the duration required to complete the desired intra-frequency search. This may be accomplished by blocking frequency switching for a pre-determined period. Alternatively, frequency switching is disabled until a searcher, such as searcher 240, signals that the search is complete. Thus, searches of fixed duration as well as variable duration searches may be accommodated.

In step 460, the desired search is performed. Frequency gaps are temporarily disabled during this time, so a test is not needed to determine if the search is interrupted. When the search is complete, return to step 410 to reset the search timer, as described above.

Figure 5A:
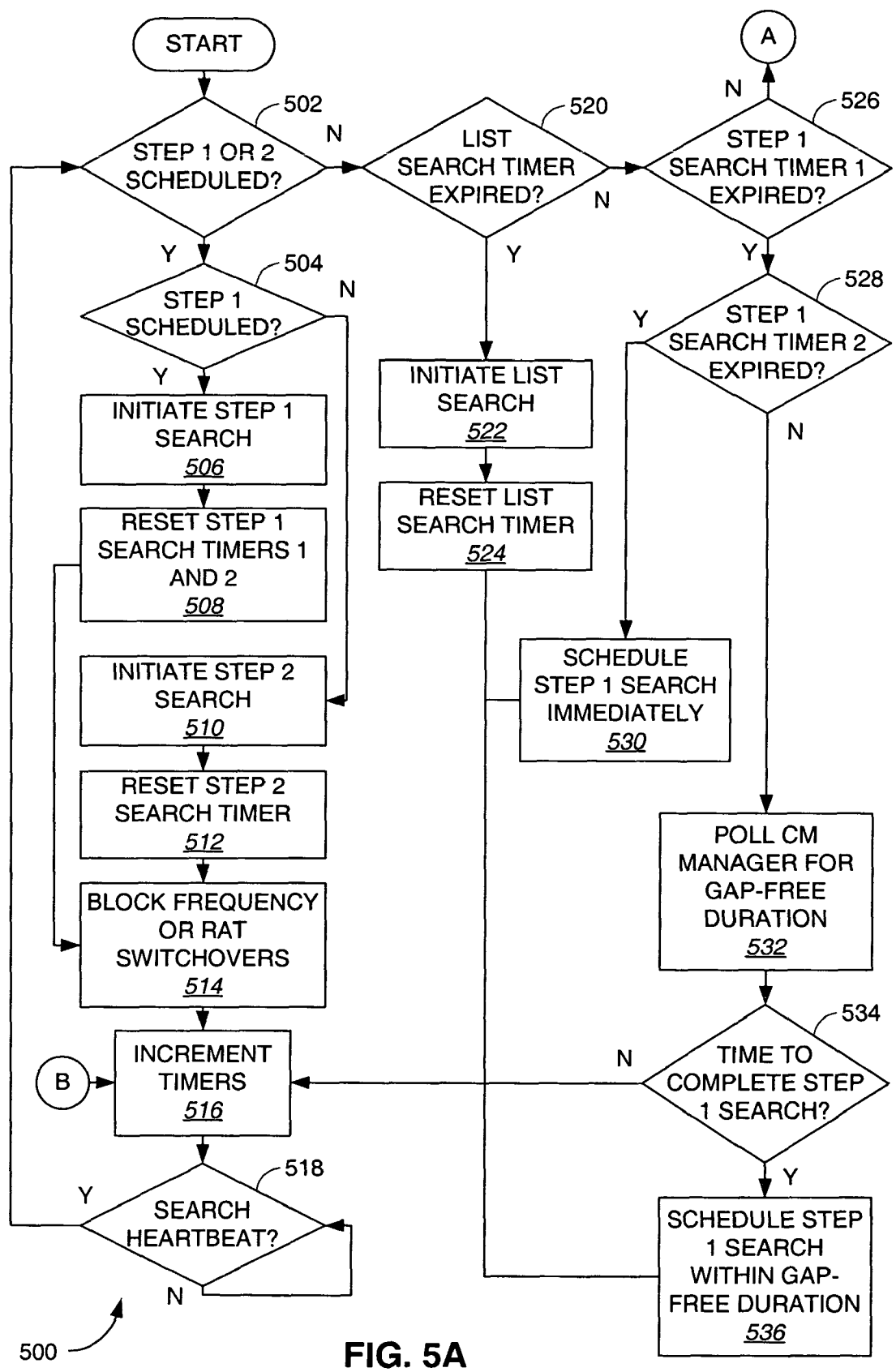
FIG. 5 is a flowchart of a method of maintaining Step 1/2/3 and list searches in the presence of frequency gaps.
Figure 5B:
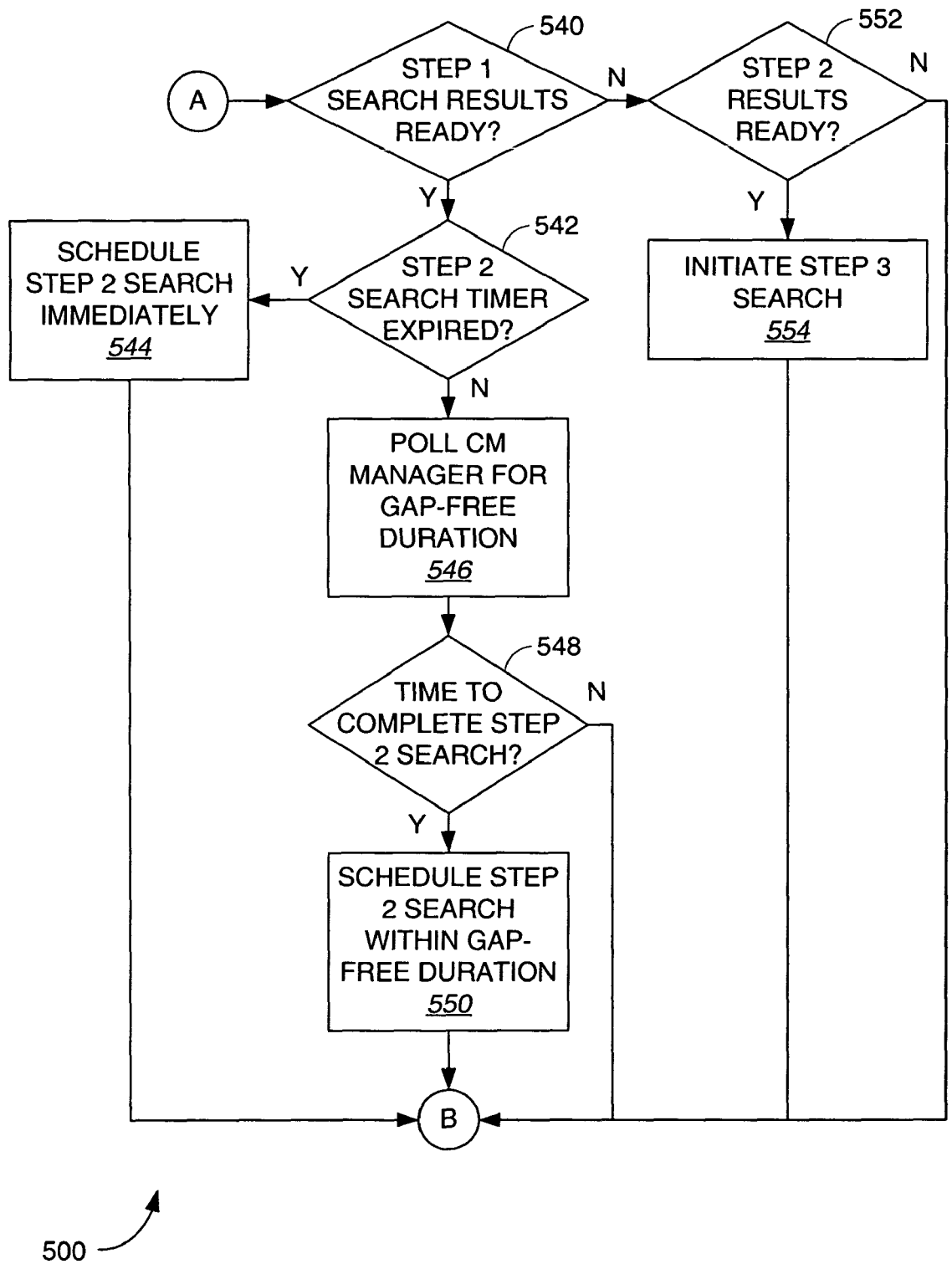

FIG. 5 is a flowchart of a method 500 of maintaining Step 1/2/3 and list searches in the presence of frequency gaps. This method is adaptable for operation in a processor, i.e. 250, as search scheduler 320. Various timers are used to ensure the maximum times required between the various searches are not exceeded. This example embodiment is described with respect to W-CDMA search requirements, for illustrative purposes. The principles described will be readily applied to any number of alternate embodiments by those of skill in the art.

The embodiment depicted in FIG. 5, detailed further below, may be summarized as follows: Step 1 searches are governed by two timers. Step 1 searches are scheduled when a first timer expires, provided there are sufficient consecutive uncompressed frames (i.e. no frequency gaps) to complete the step 1 search. If this condition has not been met before a second timer expires, then frequency or radio access technology changes are prohibited and a step 1 search is scheduled immediately. This ensures a minimum search rate for step 1 searching.

Step 2 searches are scheduled right away following completion of their respective step 1 searches, provided there are enough consecutive uncompressed frames to finish the searches. If a pending step 2 search has not been completed before a step 2 timer expires, frequency or radio access technology changes are prohibited and the step 2 search is scheduled immediately. This ensures that the step 2 search is performed while the step 1 results are fresh.

When the required number of consecutive uncompressed frames for a step 1 or 2 search occurs in the future, as indicated by a CM manager, for example, the respective search may be scheduled as the highest priority search to start at the beginning of the uncompressed period.

List searches, step 3 searches, or similar searches (i.e., the frame timing, code group or even scrambling code is already known) are executed right away as their timers expire. Since they may be completed in a relatively short period of time, if a frequency gap interferes with a step 3 or list search, it may be simply reattempted until it completes successfully (details not shown).

Method 500 may be iterated repeatedly, with each iteration triggered by a timing signal. In this example, the timing signal is identified as "search heartbeat". During each iteration, a search is either initiated or scheduled. This embodiment may be adapted for operation with a searcher, such as searcher 240, and a compressed mode or other frequency gap manager, such as CM manager 330.

The process begins in decision block 502, to test for any scheduled searches. In this example, only two types of searches are scheduled, step 1 and step 2. Those of skill in the art will readily adapt this embodiment to support scheduling any number of searches, and search types. If a step 1 or step 2 search has been scheduled in a previous iteration, proceed to decision block 504.

In decision block 504, if a step 1 search is scheduled, proceed to step 506 to initiate a step 1 search. This may be accomplished by directing a searcher to carry out a step 1 search, using appropriate parameters. In step 508, the two timers, timer 1 and timer 2, are reset, since the step 1 search will be performed, as scheduled. Proceed to step 514.

In step 514 (which may be carried out in an alternate order, for example, prior to step 506 or 510, detailed below) frequency or RAT switchovers are blocked, if necessary. For example, if the step 1 search was scheduled within a suitable period of uncompressed frames, then a frequency block will be unnecessary. However, in such a case, blocking a frequency switch that will not occur is not harmful. On the other hand, if step 1 search timer 2 has expired, then the step 1 search will have been scheduled without regard to the presence or expectation of frequency gaps. Rather, the search must be initiated promptly, to avoid exceeding the maximum delay between step 1 searches. As such, frequency gaps will be prevented to allow the step 1 search to complete properly.

If, in decision block 504, a step 1 search was not scheduled, then the scheduled search is a step 2 search. Proceed to step 510 to initiate a step 2 search. Note that, in this example W-CDMA 3-step search embodiment, a step 2 search will be triggered by the completion of a step 1 search. In step 512, reset the step 2 search timer, since a step 2 search will be performed. Proceed to step 514 to block frequency or RAT switchovers as necessary, as described above.

Thus, only one or the other of the two types of scheduled searches will be initiated. However, in an alternate embodiment, multiple search types may be initiated concurrently, or competing requests may be initiated according to an arbitration scheme. This method is adaptable for use with multiple searchers, or searchers capable of performing two or more searches or search types simultaneously.

Proceed to step 516 to increment the various timers (those being reset need not be incremented). Proceed to decision block 518, where the process remains until a search heartbeat event occurs, in which case the process returns to the beginning, decision block 502.

In decision block 502, if a search is not scheduled, proceed to decision block 520. A timer is used to maintain a minimum frequency of list searches. If the list search timer has expired, proceed to step 522 to initiate a list search. One or more base stations may be searched during a list search. The list search timer may be reset in step 524, subsequently, previously, or concurrently with step 522. Then return to step 516 to increment the various timers, as described above. As before, a reset list search timer need not be incremented.

Note that in this embodiment, frequency switch blocking is not deployed for list searches. This is because list searches are relatively short, and are therefore more likely to be completed without interruption by a frequency gap. If a frequency gap interrupts one or more of the list searches initiated, those interrupted searches may be reattempted until they are completed successfully. In this embodiment, frequency switch blocking is not required due to the relatively short search time required, and the relatively high availability of time available on the serving frequency to complete them. These details are not shown in FIG. 5. In an alternate embodiment, frequency switch blocking and/or scheduling in concert with a frequency gap manager may be deployed for list searches as well, as detailed for step 1 and 2 searches below.

If the list search timer has not expired in decision block 520, proceed to decision block 526. Step 1 search timer 1 is deployed to maintain a minimum frequency of step 1 searches. If the timer has expired, an attempt to schedule a step 1 search around frequency gaps will be made. A second step 1 search timer, step 1 search timer 2, will be used to limit the amount of time allowed to attempt to schedule a step 1 search around frequency gaps. Proceed to decision block 528 to determine if step 1 search timer 2 has expired. If not, proceed to step 532.

In step 532, the CM manager is polled to determine the presence of a gap-free period of time sufficient to complete a step 1 search, and the time that gap-free period will begin. In decision block 534, if a suitable gap-free duration will be available within a pre-determined time frame, proceed to step 536 to schedule the step 1 search within the gap-free duration. The scheduled search may be initiated as described above. Note that blocking frequency switches for such a scheduled search is not necessary, since the scheduling ensures that the search will be completed in a gap-free duration. However, blocking frequency switches may be allowed, even though no switch is expected to occur, as detailed above. Then proceed to step 516 to increment the timers, as described above. If a gap-free duration is not available, proceed directly to 516 without scheduling a step 1 search. As detailed above, a step 1 search timer 2 will be used to limit the delay from an expired step 1 search timer 1 until a step 1 search is scheduled.

In an alternate embodiment, attempting to schedule around frequency gaps may be omitted. Instead, a step 1 search may be scheduled, and the step 1 timer is not reset until a step 1 search is completed successfully (details not shown). A step 1 search that is interrupted with a frequency switch may be reattempted until the step 1 search timer 2 expires.

In decision block 528, if step 1 search timer 2 has expired, proceed to step 530 to schedule a step 1 search immediately. The expectation of frequency gaps will not be factored into the scheduling, as frequency switches will be blocked to maintain the minimum step 1 search frequency, as described above. Then proceed to step 516.

In decision block 526, if step 1 search timer 1 has not expired, proceed to decision block 540 to determine if step 1 search results are ready for processing with a step 2 search. Note that a timer for maintaining minimum frequency of step 2 searches is not required, since step 2 searches naturally follow the completion of a step 1 search, a minimum frequency of which is maintained, as just described. If step 1 search results are ready, proceed to decision block 542.

A step 2 search timer is deployed to maintain a maximum delay from the completion of a step 1 search to the initiation of a step 2 search. This ensures that the step 1 search results are fresh for the step 2 search. In decision block 542, if the maximum time has not been reached, i.e. the step 2 search timer has not expired, proceed to step 546. The gap manager, the CM manager in this embodiment, is polled to determine whether a suitable gap-free duration exists (within a predetermined time frame) for completion of the step 2 search. In decision block 548, if such a duration is found, a step 2 search is scheduled accordingly. This process is similar to the step 1 scheduling described above. Then proceed to step 516 to increment the timers, as before. If no gap-free duration is available, proceed directly to step 516 without scheduling a step 2 search.

If the step 2 search timer has expired in decision block 542, proceed to step 544 to schedule a step 2 search immediately. The expectation of frequency gaps will not be factored into the scheduling, as frequency switches will be blocked to maintain the maximum step 1 to step 2 delay, as described above. Then proceed to step 516.

In decision block 540, if step 1 search results are not pending for step 2 searching, proceed to decision block 552 to test whether step 2 results are ready. In this example W-CDMA 3-step search, step 3 searching will naturally follow the completion of step 1 and step 2 searches. If no step 3 search is required, proceed to step 516 to increment the timers. If step 2 results are ready, proceed to step 554 to initiate a step 3 search. In this example, a step 3 search is similar to a list search. A step 3 search may be initiated, and a step 3 search (or portion thereof) interrupted by a frequency gap may be reattempted until the search is completed. In this example, there will be ample time to complete the step 3 search among the frequency gaps. Therefore, scheduling around frequency gaps is not required, nor is maintaining, with a timer, a minimum step 3 frequency or delay with respect to step 2 completion.

Thus, the embodiment of FIG. 5 illustrates maintaining a desired search performance for four classes of search types. Attempts to schedule a subset of the classes around the expected frequency gaps, while others are simply initiated reattempted when a gap interrupts. A subset of the classes may have frequency switches blocked to guarantee completion at a certain time. Some of the search classes may be dependent upon successful completion of one or more other search classes. Those of skill in the art will recognize that the principles illustrated with this example may be applied to any number of search classes of various types, and the application of these techniques to any combination of subsets of the classes.

It should be noted that, in all the embodiments described above, method steps can be interchanged without departing from the scope of the invention. The descriptions disclosed herein have in many cases referred to signals, parameters, and procedures associated with the GSM or W-CDMA standards, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
a search scheduler for scheduling a search based at least in part on a duration of a serving cell transceiving gap defined for searching outside of a serving cell and for generating a frequency switch blocking signal to override opening the serving cell transceiving gap for searching outside of the serving cell;
a frequency controller for generating frequency switch commands, receiving the frequency switch blocking signal, and suppressing the generation of frequency switch commands when the frequency switch blocking signal is asserted; and
a gap manager for indicating when a frequency switch is to occur, and wherein the search scheduler schedules the search during a period of time without the frequency switch as indicated by the gap manager.

2. The apparatus of claim 1, wherein the search scheduler comprises a timer, the expiration of which indicates a search is to be scheduled.

3. The apparatus of claim 2, wherein the search scheduler schedules a search without asserting the frequency switch blocking signal prior to the timer expiration.

4. The apparatus of claim 2, wherein the timer resets upon the completion of a scheduled search.

5. The apparatus of claim 2, wherein the search scheduler schedules a search and asserts the frequency switch blocking signal subsequent to the timer expiration.

6. The apparatus of claim 1, wherein the search scheduler asserts the frequency switch blocking signal during the scheduled search.

7. The apparatus of claim 1, wherein the search scheduler schedules a plurality of search types.

8. The apparatus of claim 7, wherein the search scheduler schedules one or more of the plurality of search types in response to the frequency switch indicator received from the gap manager.

9. The apparatus of claim 7, wherein the search scheduler comprises a plurality of timers corresponding to one or more of the plurality of search types, the expiration of each timer indicating a search of the respective search type is to be scheduled.

10. The apparatus of claim 9, wherein the search scheduler schedules a search corresponding to one of the plurality of search types and asserts the frequency switch blocking signal subsequent to the respective timer expiration.

11. The apparatus of claim 7, wherein the plurality of search types comprises one or more of a list search, a W-CDMA step one search, or a W-CDMA step two search.

12. A first Integrated Circuit (IC), responsive to a frequency switch signal generated in a second IC, the second IC comprising:
a search scheduler for scheduling a search based at least in part on a duration of a serving cell transceiving gap defined for searching outside of a serving cell and for generating a frequency switch blocking signal to override opening the serving cell transceiving gap for searching outside of the serving cell;
a frequency controller for generating a frequency switch signal comprising frequency switch commands, receiving the frequency switch blocking signal, and suppressing the generation of frequency switch commands when the frequency switch blocking signal is asserted; and
a gap manager for indicating when a frequency switch is to occur, and wherein the search scheduler schedules the search during a period of time without the frequency switch as indicated by the gap manager, the first IC comprising:
a frequency synthesizer to receive the frequency switch signal from the second IC and to generate an output signal, the frequency of the output signal changing from a first frequency to a second frequency in response to the frequency switch signal.

13. A wireless communication device, comprising:
a processor for
indicating when a frequency switch is to occur;
scheduling a search based at least in part on a duration of a serving cell transceiving gap defined for searching outside of a serving cell and during a period of time without the frequency switch;
generating a frequency switch blocking signal to override opening the serving cell transceiving gap for searching outside of the serving cell;
generating frequency switch commands; and
suppressing the generation of frequency switch commands when the frequency switch blocking signal is asserted.

14. The wireless communication device of claim 13, further comprising a frequency synthesizer to receive the frequency switch commands and to generate an output signal, the frequency of the output signal changing from a first frequency to a second frequency in response to the frequency switch commands.

15. The wireless communication device of claim 13, further comprising a searcher for searching in accordance with the scheduled search and for indicating to the search scheduler when the scheduled search is complete.

16. A method of searching in the presence of frequency gaps, comprising:
indicating when a frequency switch is to occur;
scheduling a search based at least in part on a duration of a serving cell transceiving gap defined for searching outside of a serving cell and during a period of time without the frequency switch;
generating a frequency switch blocking signal to override opening the serving cell transceiving gap for searching outside of the serving cell;
generating frequency switch commands; and
suppressing the generation of frequency switch commands when the frequency switch blocking signal is enabled.

17. The method of claim 16, further comprising:
determining future frequency switches; and
wherein the search is scheduled during a time period in which no future frequency switches are determined.

18. The method of claim 17, further comprising:
timing the duration between searches; and
scheduling searches without suppressing frequency switches prior to the timed duration reaching a predetermined maximum.

19. An apparatus, comprising:
means for indicating when a frequency switch is to occur;
means for scheduling a search based at least in part on a duration of a serving cell transceiving gap defined for searching outside of a serving cell and during a period of time without the frequency switch;
means for generating a frequency switch blocking signal to override opening the serving cell transceiving gap for searching outside of the serving cell;
means for generating frequency switch commands; and
means for suppressing the generation of frequency switch commands when the frequency switch blocking signal is enabled.

20. A storage medium device encoded thereon with processor-executable instructions for causing a processor to perform the following steps:
- indicating when a frequency switch is to occur;
- scheduling a search based at least in part on a duration of a serving cell transceiving gap defined for searching outside of a serving cell and during a period of time without the frequency switch;
- generating a frequency switch blocking signal to override opening the serving celltransceiving gap for searching outside of the serving cell;
- generating frequency switch commands; and
- suppressing the generation of frequency switch commands when the frequency switch blocking signal is enabled.

* * * * *

UNITED STATES PATENT AND TRADEMARK OFFICE
CERTIFICATE OF CORRECTION

| | | |
|---|---|---|
| PATENT NO. | : 7,917,163 B2 | Page 1 of 1 |
| APPLICATION NO. | : 10/650564 | |
| DATED | : March 29, 2011 | |
| INVENTOR(S) | : Amerga | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this
Ninth Day of August, 2011

David J. Kappos
*Director of the United States Patent and Trademark Office*